NON-SYNCHRONOUS PHASE SHIFT COMMUNICATION SYSTEM

Filed Nov. 5, 1962 6 Sheets-Sheet 1

INVENTORS
CECIL A. CRAFTS
ROBERT LEWIS CARLSON
PERRY H. GOODWIN, JR.
BY
Browne, Schuyler & Beveridge
ATTORNEYS INVENTORS
CECIL A. CRAFTS
ROBERT LEWIS CARLSON
PERRY H. GOODWIN, JR.
BY
Browne, Schuyler & Beveridge
ATTORNEYS

NON-SYNCHRONOUS PHASE SHIFT COMMUNICATION SYSTEM

Filed Nov. 5, 1962 6 Sheets-Sheet 3

INVENTORS
CECIL A. CRAFTS
ROBERT LEWIS CARLSON
PERRY H. GOODWIN, JR.
BY Browne, Schuyler & Beveridge
ATTORNEYS June 21, 1966 C. A. CRAFTS ETAL 3,257,508

NON-SYNCHRONOUS PHASE SHIFT COMMUNICATION SYSTEM

Filed Nov. 5, 1962 6 Sheets-Sheet 4

INVENTORS
CECIL A. CRAFTS
PERRY H. GOODWIN, JR.
ROBERT L. CARLSON

BY

Browne, Schuyler and Beveridge
ATTORNEYS

June 21, 1966 C. A. CRAFTS ET AL 3,257,508

NON-SYNCHRONOUS PHASE SHIFT COMMUNICATION SYSTEM

Filed Nov. 5, 1962 6 Sheets-Sheet 5

INVENTORS
CECIL A. CRAFTS
PERRY H. GOODWIN, JR.
ROBERT L. CARLSON

BY

Browne, Schuyler and Beveridge
ATTORNEYS

June 21, 1966 C. A. CRAFTS ETAL 3,257,508

NON-SYNCHRONOUS PHASE SHIFT COMMUNICATION SYSTEM

Filed Nov. 5, 1962 6 Sheets-Sheet 6

INVENTOR.
CECIL A. CRAFTS
PERRY H. GOODWIN, JR.
ROBERT L. CARLSON

BY Browne, Schuyler and Beveridge
ATTORNEYS 3,257,508

NON-SYNCHRONOUS PHASE SHIFT COMMUNICATION SYSTEM

Cecil A. Crafts, Santa Ana, Perry H. Goodwin, Jr., Corona Del Mar, and Robert L. Carlson, Fullerton, Calif., assignors to Robertshaw Controls Company, Richmond, Va., a corporation of Delaware Filed Nov. 5, 1962, Ser. No. 235,918
27 Claims. (Cl. 178—67)

This invention relates to a non-synchronous phase modulation system using incoherent phase demodulation as opposed to prior phase modulation systems requiring the complexities of phase synchronization or comparison in a coherent system. This application is a continuation-in-part of Serial No. 171,472, filed February 6, 1962.

Phase modulation has been generally understood to always require coherence for demodulation, since demodulation takes place by comparing the phase of the received signal with the phase of either a stored or locally generated reference signal which is a replica of that at the transmitter, or with a stored signal representing the average value of the phase during the preceding bit transmission. The first type demodulation is truly coherent and the second is regarded as differentially coherent.

If no use is made of the coherence of the carrier signal, or no coherence occurs, the system is said to use an incoherent demodulation process, since a coherent signal is defined as one in which a defined phase-time relationship exists. Incoherent demodulators include envelope detectors (A.M.), and frequency-shift keying system demodulators. It has been widely acknowledged that incoherent systems are inferior to differentially coherent systems and that the truly coherent systems are of highest reliability for a given signal energy input, and require least band width at any information rate. By the present invention it becomes possible to secure substantially the advantages of simplicity and reliability of a coherent system transmission but to receive and demodulate the signals by a typically incoherent method and apparatus, conserving frequency spectrum to a degree no less than in the coherent system, while reception, particularly for low noise circuits, has the simplicity of the incoherent system.

This invention thus relates to improved method and apparatus in a system of communication of digital information in which positive and negative elements of a binary signal, or plurality of binary signals, are impressed upon a carrier wave as advanced and retarded phase shifts, respectively, the binary signals being recovered by the receiver without the development of a phase reference signal for resolving the phase shift information. More particularly, it relates to a system employing a single frequency of transmission for each channel in which the phase advancement and retardation appear as phase transients extending over several cycles of the carrier wave and substantially throughout each band for the maximum transmission rate for which the system is designed.

It is known to communicate by keyed phase shifts and, by transmitting both a reference and a modulated wave, to compare the received phases. It is also known to generate a phase stable reference from the received modulated wave for phase comparison. A number of devices have also employed phase reversal techniques, but these devices require resonant circuit synchronism between the receiver and the transmitter and are subject to ambiguities of interpretation of the information transmitted unless special precautions are taken. Some of these devices employ multiply and divide circuitry in order to avoid the necessity of transmitting a reference wave with the modulated wave.

It is also known to employ square wave generators triggered once for each cycle of received wave in order to demodulate frequency modulations. Such devices have variously differentiated this signal and employed it for the initiation of series of fixed duration voltage excursions, which, upon integration, yield an average signal bearing the information transmitted. These devices are used for the recovery of information in binary form when the carrier frequency is shifted in a definite pattern between two alternate frequencies of transmission. It is also known to transmit mark and space information signals by varying in discrete steps the phase of a transmitted wave. Such apparatus has not been adaptable to the reception and demodulation of multi-level information signals representing more than on-off signals, which correspond to two levels of signal, generally referred to as a binary signaling system. Devices to receive phase modulated multi-level signals have heretofore been complex or have involved many steps in a demodulation process, and have not been adaptable to multi-step phase shift procedures.

Other devices have been disclosed wherein two digital signals may be superposed on one carrier frequency as in Patent No. 2,977,417, but which require synchronization between the transmitter and receiver to effect any recovery of intelligence. It has also been proposed to transmit a neutral frequency and to indicate the start of a binary bit by a frequency deviation in one direction and the termination of the same bit by a frequency deviation in the opposite direction from the neutral. Such a system requires three frequencies to be generated and transmitted and then to be recognized in the receiver. Furthermore, the requirement that the neutral frequency be established for a relatively long interval in the middle of each information bit, during which interference may cause error unless the amplitude is also modulated, requires complexities and slowed transmission speed not compatible with desired high speed requirements.

It is an object of this invention to provide a simple and direct method of modulation and demodulation of a carrier wave by phase shifts in a non-synchronous system.

Another object of the invention is to provide a method of phase modulating a carrier of a single frequency such that advanced and retarded phases may be detected non-synchronously at the receiver.

Another object is to provide a non-synchronous phase shift detection method.

Another object is to provide a transmitter and receiver for digital information signals of at least four characters on a single frequency of transmission as used in the diplexing of paired binary information signals.

A further object of this invention is to provide improved circuitry employable as modules of a communication set.

A final object is to achieve a high rate of binary information transfer at substantially a single frequency where the rate is controlled only by the time required for completion of a phase shift for the frequency of that channel.

To achieve these and other objects, applicant transmits by radio or closed circuit, receives and filters the incoming wave, passes the received wave through a limiter, usually of several stages, to provide a square wave of equal and opposite voltage excursions. The square wave is then differentiated and diode clipped, after which it is passed to a multivibrator or equivalent device designed to produce a voltage excursion of definite predetermined length for each axis crossing of the squared wave occurring in either the positive or negative direction. The resulting constant amplitude and duration voltage pulses vary in recurrence rate in accordance with the frequency received, and/or in accordance with phase shifts in the received wave, and are then integrated, usually by a low pass filter, to form an output wave containing the information impressed upon the carrier at the transmitter. In order to achieve the multi-level signal reception applicant employs a trigger circuit, such as the Schmitt trigger, having the characteristic of producing positive and negative voltage excursions in accordance with the sign of any change which occurs in the received signal corresponding to the transmitted phase change; and by employing a series of such trigger circuits actuated by the same receiver in parallel each feeding into a summing circuit, produces an output signal varying in magnitude steps as well as in direction of voltage excursion, in a form suitable for actuating conventional recording apparatus. In a simplex system a preferred arrangement retains the receiver on Mark when no signal is received.

Other objects and features of the invention will be understood by reference to the accompanying drawings wherein.

Figure 1:
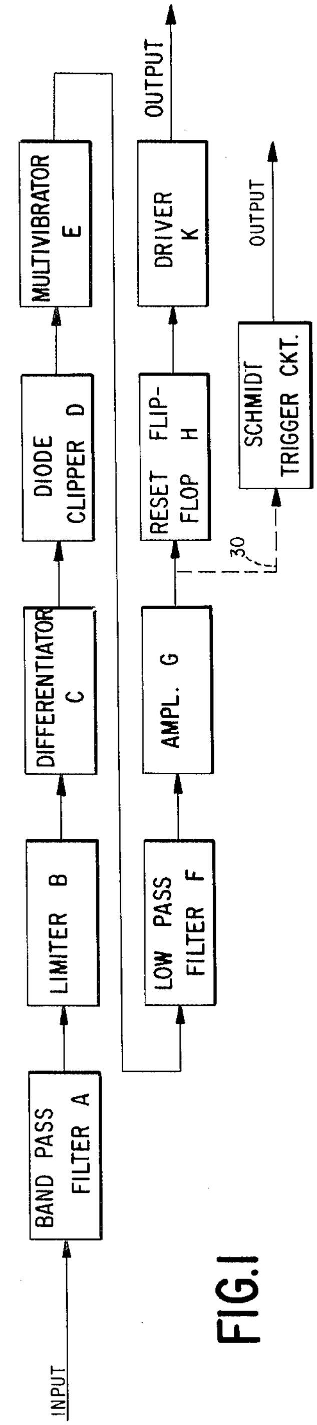
FIG. 1 is a block diagram of a phase and/or frequency modulation detector operating to detect phase transients according to this invention.
Figure 4:
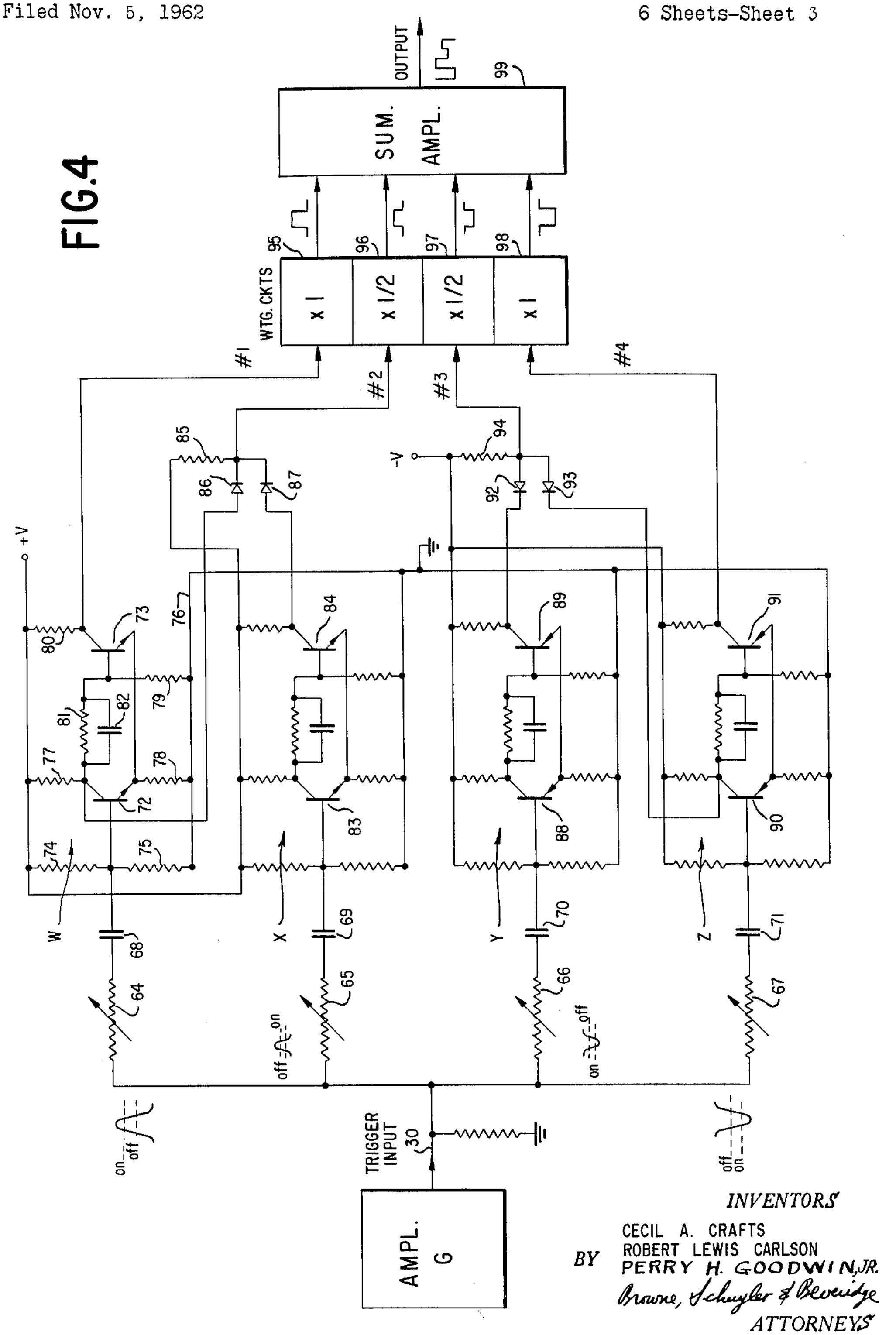
FIG. 4 illustrates summing and weighting circuitry employable with the schematics of FIG. 3 for diplexed phase modulation signals.

The detector circuit at FIG. 1 consists basically of a filter A, a limiter stage B, a differentiator stage C, a diode clipper stage D, a multivibrator stage E, and a low pass filter stage F, which provide a frequency demodulator of elemental type. An amplifier G and optionally a trigger stage H and a recorder driver K, or a group of trigger circuits such as the summing and weighting circuit of FIG. 4 are followed by utilization circuitry. The filter A essentially confines the received signal to one channel of information by sharply limiting or filtering the accepted frequency range so that essentially a single frequency of carrier is received and passed to the limiter stage. The band pass filter may be of suitably narrow frequency-passing characterisics to accept a single carrier frequency with side bands corresponding only to the keying frequency, such that many similar channels may be transmitted in adjacent frequency bands within the voice frequency range, each band being separated by a filter such as A to present to the limiter stage only the desired frequency as modified by its phase change according to the signal impressed thereupon at the transmiter.

The limiter stage operates, usually by amplification and saturation limiting, to convert a sine wave carrier signal into a group of square waves having equal positive and negative excursions. These positive and negative excursions are alike not only in amplitude but in duration. It is the function of the limiter to produce a signal in which positive and negative crossings of the zero voltage axis are sharp and definite and are related only to the time phases of that frequency which it is desired to process in the particular receiver component here under consideration.

A limited sine wave is generally regarded as a squared wave, and for the purpose of this invention it is only important that this stage produce a signal from which voltage spikes may be produced in a differentiating stage as at C, one positive spike for each positive crossing of the zero voltage axis and one negative spike for each negative crossing of that axis.

The transmitter apparatus for the present system is a conventional phase shift circuit modified to provide an output frequency limited during the intervals of that phase transient to prevent any spill over from one channel to an adjacent channel, when the apparatus is used in frequency multiplex wherein the channels are separated from each other by approximately 100 c.p.s. A conventional oscillator is designated as a tone generator in FIG. 1, the output of which is passed to a phase selector circuit employing a conventional phase lead circuit, when a key is depressed to advance the phase of the transmitted wave, and a normal unshifted oscillator output when the key is not depressed. Various other equivalent circuitry may be employed for which only a single example well-known in the art is illustrated.

The output of the phase selector circuit is indicated as having abrupt phase shifts whenever the key is depressed or released. Such an abrupt phase shift would produce frequency transients which overlap adjacent channels of a phase multiplex communication system, except that a reactance circuit is indicated as coupling the phase selector output into the communication link from which the receiver gets signal input. This reactance circuit may be a conventional band pass filter of very narrow band frequency transmission, or may be of other known types such as to prevent the passage of any interfering frequency transients to the line or link. The line accordingly has a single frequency thereon except that phase shifts which convey the information as transient phase excursions are gradually applied thereto over a period of two or more cycles, which phase transients are resolvable as a lengthening or shortening of the wave period with a result similar to the application of very short frequency transients sufficient in length to effect phase changes up to about three-eighths of a cycle. A frequency shift system is of different character and result but is described herein as illustrating the demodulation of angle modulated waves generally.

Figure 2:
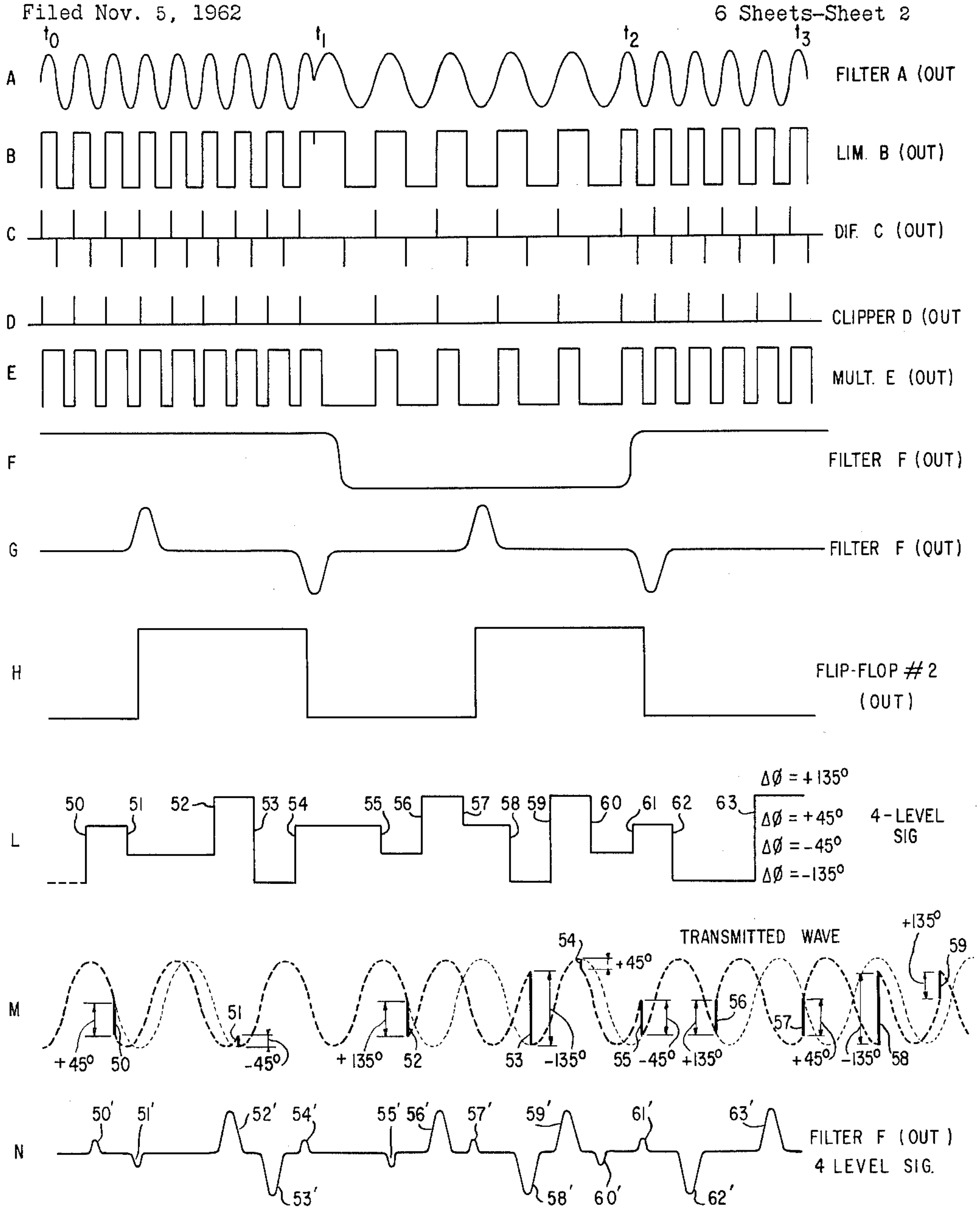
FIG. 2 is a series of voltage-time representations of the signals as processed by the detector.

In FIG. 2 curve A represents in the interval between $t_0$ and $t_1$ a carrier frequency which is not modulated, and at $t_1$ there is shown a change both in phase and in frequency, while between $t_1$ and $t_2$ there is shown a second frequency of transmission which corresponds to a modulation of the frequency of the carrier. At $t_2$ there is shown a reversion to the first frequency, in this case occurring without a phase change, and between $t_2$ and $t_3$ there is shown the original unmodulated carrier wave. For purposes of illustration the change in frequency illustrated between $t_1$ and $t_2$ is much larger than would normally be employed in the communications system of this invention for reasons of conservation of frequency spectrum. Curve B of FIG. 2 shows the result of squaring the wave of curve A, whereby there are produced equal positive and negative excursions of the unmodulated wave between $t_0$ and $t_1$. Between $t_1$ and $t_2$ there are likewise equal positive and negative excursions of voltage, these being equal both in magnitude and in duration. Also shown at $t_1$ in curve B is the result of a change of phase during a positive excursion of the curve A such that a longer interval is produced between two adjacent positive or negative excursions of the voltage wave. As will hereafter be more readily realized this high percentage change of spacing between zero crossings of the voltage curve is important and is fundamental to use of the detector of this invention for phase demodulation.

Figure 3:
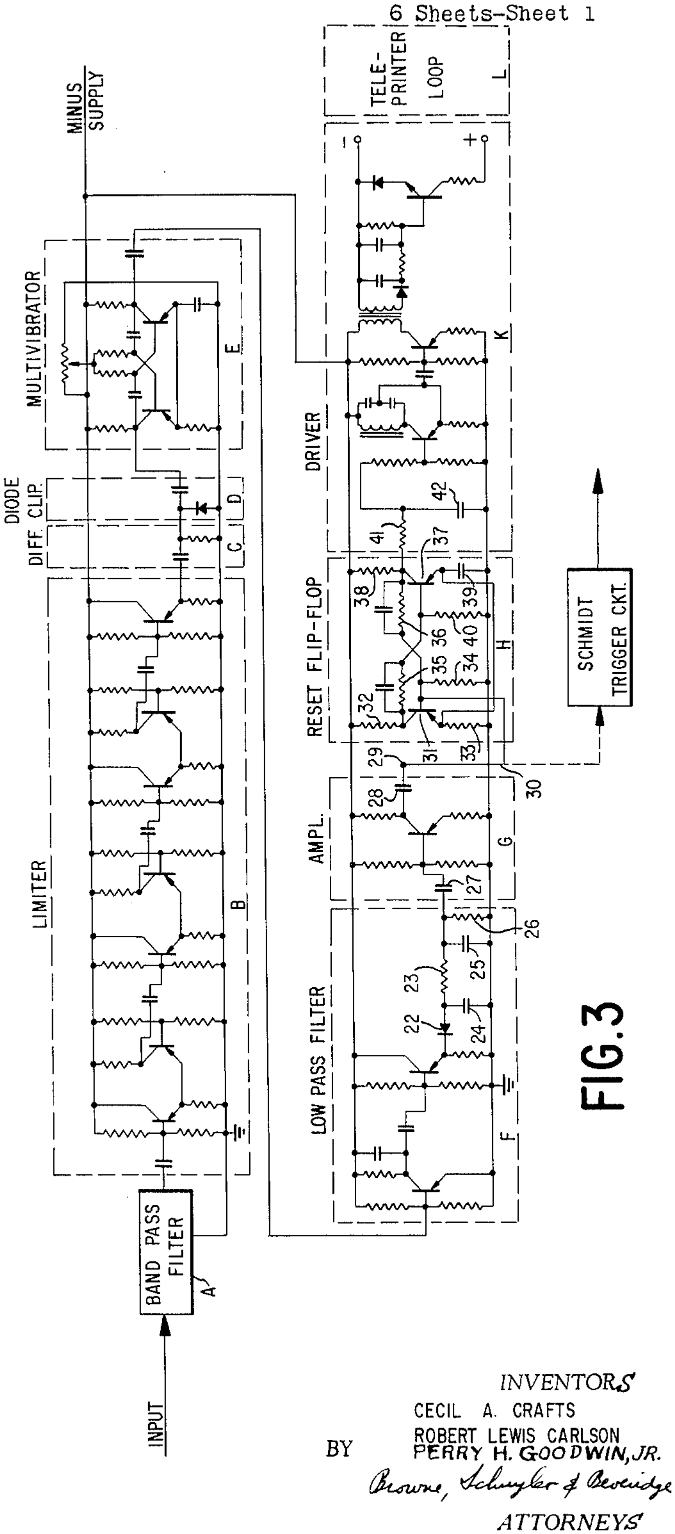
FIG. 3 is a schematic diagram of one form of circuitry for practicing the invention according to the diagram of FIG. 1.

The output of limiter B is passed through a suitable differentiator circuit illustrated at C of FIG. 1, and in the schematic diagram of FIG. 3, as merely a series capacitor and a resistor connected from the output thereof to ground. By such a circuit the square wave output of limiter B is processed to form successive positive and negative voltage spikes as hereinbefore mentioned.

In order to construct from these spikes, timed as to carrier signal voltage zero crossings, a voltage curve which can be summed to produce a detected signal, it is most convenient to eliminate either the positive or the negative voltage excursion spikes. As illustrated in FIGS. 2 and 3 this is done by means of the simple diode connection from the output of the differentiator to ground, followed by a series capacitor for coupling the voltage of ungrounded polarity to the next stage. As illustrated, the diode clipper D may be arranged to ground or to short circuit all negative pulses, leaving the positive voltage spikes applied to the series capacitor, according to well known techniques. By reversing the polarity of the diode the negative spikes might be selected and the positive spikes grounded, if desired.

Alternatively, the negative spikes may be inverted and added to the sequence of positive spikes, each being interspersed between the adjacent spikes of the latter. Circuits for this purpose are well known and need not be further described here. The result of adding positive and negative spikes together to form a double rate signal is an increase in the signal-to-noise ratio whereby either increased signaling speed or an increase in reliability may be had.

A multivibrator E is arranged to receive the output of the clipper stage and to convert the voltage spikes into a series of constant width voltage excursions which vary only in the time of recurrence as determined by the triggering signal which is the output of the diode clipper stage. For this purpose the multivibrator may be of either of two types well known in the art as monostable and astable multivibrators.

A monostable multivibrator may be selected with a time constant such that the area under the voltage curve for each trigger pulse from the clipper stage will approximately equal one-half cycle of the carrier wave which is being processed. An astable multivibrator would be adjusted to have a similar "on" period, but with a selected "off" period of longer duration, so that the next "on" period is triggered rather than self-produced. With such an arrangement and timing of the multivibrator "on" period it will be evident that either an advanced or a retarded phase will show as a modified time between the occurrence of successive "on" periods of the multivibrator by virtue of the increased or decreased spacing between the spikes passed by the clipper stage.

A changed frequency in the received wave corresponds to a continued change in the recurrence rate of the voltage spikes wherein all such axis crossing intervals are alike during the transmission of a particular step of modulation. A phase change, on the other hand, will be evidenced by a single shift in the recurrence rate with each succeeding spike thereafter occurring in regular unaltered order until the next change in phase occurs.

In a frequency shift system the channels must be separated at least sufficiently to permit use of broader band pass filters passing two or more discrete frequencies, the steady state frequency being detected for all frequencies. In the system here disclosed the steady state condition is always the same frequency, and it is only necessary to know whether a phase shift produces an advance or retardation of phase, the former giving a positive output signal and the latter a negative signal, two levels of output being discerned of each sign for a four level system. Band width economy is effected by limiting the output frequency (and the received frequency) to eliminate any transients beyond the desired limits, for example 2% of the fixed frequency. In thus limiting the output frequency of the transmitter and/or of the receiver the duration of the transient necessary to effect the phase shift is extended only sufficiently to establish the new phase condition, which may occur, for example, in from two to ten cycles of carrier wave. The steady state frequency continuously prevails at the receiver, with variations only of transient type. It is thus unnecessary to have reactive circuitry responding equally to two or more frequencies, since it needs only to show only an increase or decrease in phase. The band pass filtering, or other frequency limiting feature of the system has the result of spreading the transient which corresponds to the phase shift. Since the resulting waves at the receiver have the characteristics of a phase shift transient distributed over several cycles of carrier the frequency shift analogy is used herein both to show the similarity of detection to one type of frequency discrimination and to show the difference therefrom inherent in use of only one frequency of transmission and in detection of positive and negative phase shifts rather than steady state frequency or phase conditions of prior systems.

Curve C of FIG. 2 will be seen to contain positive voltage spikes corresponding to the positive excursions of curve B and negative spikes corresponding to negative excursions of voltage of curve B. Curve D illustrates merely the upper half of voltage curve C containing spikes corresponding only to the positive voltage excursions. In D the dotted spikes show the double pulse rate resulting from inverting and adding the negative spikes. Curve E illustrates one timing for a multivibrator of FIG. 1 wherein the "on" time slightly exceeds the "off" time for the unmodulated wave and wherein the modulated wave is indicated between $t_1$ and $t_2$ as of lowered frequency in a frequency shift system. Accordingly, the constant width voltage excursions of curve E are farther apart and the "off" time for such excursions then exceeds the "on" time. It may also be noted that at the time of a phase shift of nearly 180°, which might correspond to a phase lag as illustrated in curve A, a considerably longer "off" time occurs. It would similarly be evident that if the frequency between $t_1$ and $t_2$ were left unchanged and the frequency shift there illustrated were replaced merely by a phase shift at $t_1$ and a return to the unmodulated form at $t_2$ the same long "off" period would occur at $t_1$, only slightly shortened from that shown in curve E. There would be likewise a similar change in phase at $t_2$ which would be represented by a diminished "off" time at that point.

In a frequency shift system where demodulation is effected as here described the phase of the wave at the time of shift in frequency has little significance, since any new frequency produces the result of a continuously changing phase for the entire period of the new frequency, thus effecting many complete cycles of phase shift to produce a continuing phase deviation signal throughout the transmission of the information bit. The present invention, on the other hand, uses no frequency shift as such, but only the apparent frequency change, evidenced by mathematical analysis, which correspondings to that physical change of wave needed to get from one phase of transmission into another. In a frequency shift system a phase shift at the beginning of a bit may be zero or of any value thereabove, but this initial change is submerged in the long-continued rapid phase progression which marks the difference of two frequencies transmitted.

In the present system only an initial phase shift has importance since the frequency is unaffected, except in the sense that a mathematically derived frequency transient may be found which would effect the phase transient impressed on the transmitted wave. This invention provides a practical means of securing such a transient, not possible to do by frequency-shift methods. It is therefore a simple non-synchronous system which effects its transfer of information by phase modulation without any phase reference. It depends upon knowledge of whether the phase is advanced or retarded, an advanced phase giving a positive D.C. output signal and a retarded phase giving a similar but negative output signal. Each phase shift must be limited to substantially less than 180° to resolve ambiguity in the sign of output signal. In a binary signaling system it has been found that to produce best signal-to-noise ratios a phase shift between 120° and 145° is most advantageous, with a preference for shifts between 130° and 135°. In a four level signal values such as 72° and 144° are illustrated. The receiver operates to interpret phase shifts as positive or negative D.C. output signals corresponding to the advanced or retarded phase. The level of transmitted signal results from the degree of shift, which is seen in the size of output signal pulse fed to the trigger circuit.

As previously noted it is usually desirable to have the multivibrator period approximately equal to double the "on" time. The reason for this is readily seen in that it is necessary to provide a sufficiently long "off" time in order that this may be decreased to indicate a return of a phase to its initial position. It was also previously noted that the multivibrator might be of the monostable type, in which case only the positive spike is required to complete one cycle of operation. If an astable type of multivibrator is used, a similar period for the "on" condition representing a positive voltage excursion would apply but with the difference that additional positive voltage spikes from curve E would be required to precede the natural recurrence time so that the spikes of curve E would be employed to modify the timing of each succeeding voltage excursion.

Curve F of FIG. 2 schematically illustrates the result of integrating a frequency deviation square wave such as the curve of E, where it is readily seen that the mean voltage represented by the curve E is approximately uniform up to time $t_1$, thereupon decreases and remains in a decreased level until time $t_2$, at which time the voltage level returns to the initial level as at $t_0$. In the case of a phase modulation of one cycle only, the frequency is not shifted between times $t_1$ and $t_2$ and only the initial and terminal timings of the multivibrator are altered. Such a condition is illustrated in curve G which shows a change in the average value of the current output from the multivibrator in which the changes in average value occur over the short period of time while the phase is being changed.

Figure 5:
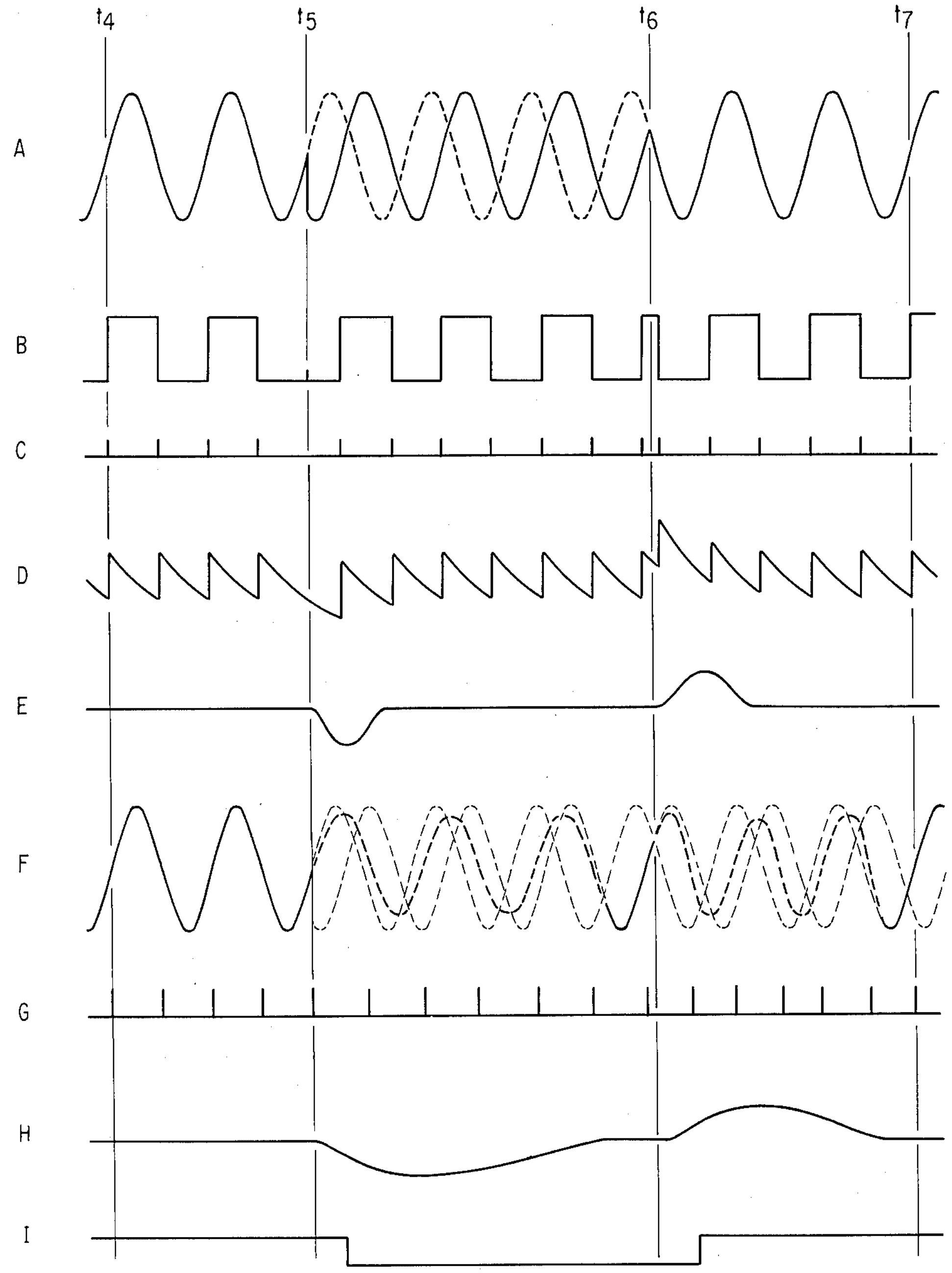
FIG. 5 illustrates by selected wave forms the phase modulated and phase-and-frequency modulated waves, together with representative wave forms developed in the detector for recovery of the phase modulation information, showing one bit of information as a retarded phase followed by a return to normal.

A reactance circuit in the transmitter output or rereceiver input operates to delay the shift in phase. A band pass filter, used either in the transmitter or receiver, has a similar effect to convert a keyed phase shift into a phase shift which occurs over a period of time, inasmuch as any high frequency components associated with a sudden change are thereby eliminated but the phase is nevertheless forced to change. FIG. 5 shows at curve A a single frequency between times $t_4$ and $t_5$, at which time the phase is instantly retarded by the phase selector until time $t_6$, which the original phase is restored. Between $t_6$ and $t_7$ the original phase is transmitted. The squared wave illustrated at B in FIG. 5 illustrates the type of wave from which curve G of FIG. 2 is derived. In FIG. 5, curve C illustrates the result of differentiating curve B, and curve D illustrates one form of such a wave after inverting negative spikes and processing to produce an integrated result from which curve E may be derived, which curve then corresponds to the curve G of FIG. 2, except that the phase has been retarded at the start of the bit transmission.

The result of band pass filtering or of passing the phase shifted wave through a reactance circuit is schematically illustrated in curve F of FIG. 5, wherein the original of curve A is illustrated for reference as continuing between times $t_5$ and $t_6$ in dotted line and the altered phase illustratively shown by dashed line. Curve A is also shown in dotted outline. It will be evident that the resulting wave will have transient characteristics somewhat as shown by dashed line in F between $t_5$ and $t_6$ up to the time, for example, just before $t_6$, when the phase becomes adjusted to the newly keyed position. Similarly, following period $t_6$ the dashed line illustrates adjustment of the phase into agreement with the original phase as illustrated in curve A in FIG. 5. The differentiated spikes illustrated in G are derived from a squaring of the curve F and thus correspond to the spikes of curve C, except that the timing is cumulatively altered over several cycles to the total deviation of about ⅜ cycle, rather than occurring all in the half cycle of the interval following the keyed phase shift.

The spikes illustrated in G are then caused to initiate a series of waves such as E of FIG. 2 or D of FIG. 5 which, upon low pass filtering, result in a curve H, which corresponds to curve E except that the transient is stretched out over several cycles of received wave. The voltage curve I of FIG. 5 is generated from H by causing voltages changes of curve H to trigger a suitable square wave generating circuit, actuated in one direction by a negative departure of the curve H and actuated in the opposite direction by a positive departure of curve H.

In FIG. 3 there is illustrated a low pass filter F comprising preferably a plurality of voltage amplification stages coupled, for example, by a capacitor of large value such as to permit the passage of low frequency signals. The output of the amplifier final stage is then suitably filtered to remove all high frequency components such as would be present at the output of the multivibrator E. A suitable low pass filtering arrangement may be achieved, for example, by employing a diode in the output circuitry from the final amplifying stage, followed by a series resistor having a capacitor connected at each end thereof, each capacitor being grounded at its opposite end to form a conventional filter network. Such a diode 22 may, of course, be connected in either polarity to correspond to the amplifier configuration producing positive or negative outputs. Resistor 23 and capacitors 24 and 25 are of values selected to provide a time constant appropriate to the cutoff frequency above which signals will not be passed. Resistor 26 is connected to the output of the filter and to ground in order to suitably return the voltage to a constant level in the absence of signal and to assist in the formation of the appropriate time constant.

The output of filter F thus contains the signal which it is desired to receive from a remote transmitter and may be of the form F or G depending upon whether the type of modulation employed is square wave frequency or square wave phase modulation. Such a signal would conveniently be further amplified as by amplifier G, which may be of conventional form employing input coupling capacitor 27 and output coupling capacitor 28 or other conventional coupling arrangements. An output terminal 29 is conveniently supplied for connection to other circuitry as by line 30.

In one form of the invention the amplifier G is followed by a trigger circuit of conventional design which may be employed for the purpose of creating a square wave to duplicate the square wave employed at the transmitter and modulating the carrier wave. While curve F approximates such a modulation signal and contains the information transmitted in the form of frequency modulation such a wave is, by the manner of its formation in filter F, not adequately abrupt in rise or decay of voltage. For this reason a trigger circuit such as H is connected to terminal 29 via conductor 30 and may comprise a pair of cross-coupled amplifiers ordinarily referred to as a flip-flop or bistable circuit, requiring first a positive pulse to actuate one amplifier to saturation followed by a negative pulse to actuate the other amplifier to saturation. Any arrangement of a pair of cross-coupled bistable amplifiers to produce square waves by circuitry well known in the art may be employed for wave shaping.

One form of wave shaping circuit employable at H might be referred as a reset flip-flop, consisting of a transistor 31 in common emitter configuration supplied with suitable negative energizing voltage by way of resistor 32 connected to a collector element of the transistor, having the emitter grounded by way of resistor 33, the transistor having a base-to-ground bias path through a further resistor 34, the base also being supplied with exciting voltage by way of conductor 30. The output of transistor 31 would thus be taken from the collector connection by way of a resistor-capacitor combination 35 to form an input for a second transistor 37 at the base thereof, which is also connected by way of resistor-condenser combination 36 from the base of transistor 31 to the collector of transistor 37, which collector is also connected to the voltage supply by way of the resistor 38 to form an energizing path and a biasing path for transistor 31.

The output of the trigger circuit H may normally be taken by way of a resistor 41 and a capacitive connection to ground as by capacitor 42 to form the input to a driver circuit for the operation of a teleprinter or other teletypewriter circuit, or for any other utilization purpose requiring conventional amplifier circuitry in the driver K.

While a particular form of trigger circuit has been described for performing wave shaping at block H of FIG. 1 it will be understood that other wave shaping means might be employed either to convert the positive and negative peaks of output from filter F into the form H or for the reshaping of the wave F which might be derived, by way of example, from a frequency modulation occurring on the same carrier wave during transmission of phase modulated signals, or at other times when the phase modulation signals are not being transmitted. While the circuits thus described might be employed for frequency demodulation without the employment of the trigger circuit of block H such a circuit is required to produce the output shown at curve H from a curve of the type shown at G.

While two channels of binary information may be simultaneously transmitted by the same carrier wave, one using frequency and the other phase shifts, some additional circuitry is required to separate these two signals as is disclosed in copending application Serial No. 168,122, filed on January 23, 1962 by M. D. McFarlane. An additional form of multiplexing of signals suitable for reception by the detector of this invention is disclosed in copending application Serial No. 64,856, filed on October 25, 1960 by Cecil A. Crafts et al., in which several degrees of phase modulation may be simultaneously employed in the same communication channel employing, for example, only a single frequency of transmission, but including phase locking and driven phase correction at the receiver.

According to the present method of detection no reference signal is required and none is developed at the receiver. The receiver nevertheless develops in a simple manner a signal output which corresponds to a number of degrees of phase modulation occurring at the transmitter. The curve L represents one form of information signal containing four levels of signal such as might be obtained by the combining of two two-level signals to be transmitted over a single frequency band by this method of transmission. Since the receiver of this invention is designed to detect changes of phase rather than actual phase positions, the four level signal of curve L indicates the changes of phase from each last-transmitted phase position rather than a specific difference of phase from the unaltered phase of the transmitter oscillator. Curve L illustrates one form of wave train which may be received by this method, as when the transmitted information is impressed upon the carrier wave in the form of four levels of phase change, each bit of each binary signal comprising a positive or negative phase shift of the same amount.

It is also important to the detection method of this invention to limit the degree of phase change at any instant to cyclic fractions less than 180°, in order that polarity of the change may be discerned with certainty and ambiguities in the detection avoided. An example of a four-level phase shift signal applied to a carrier wave is accordingly illustrated at M of FIG. 2 in which the intervals of phase change are 45° and multiples thereof. A four-level signal might be fully presented by changes of +45° and +135° and the reverse changes, or by plus and minus 60° and 120°, or 72° and 144°.

The information signal of curve L shows phase changes 50 through 63, each as a vertical line, the horizontal line following each vertical line corresponding to the signal level of the information signal, being a departure upwardly or downwardly from an assumed zero position by the required multiple of the selected cyclic fraction throughout each interval between the sending of two bits of information. Thus, the line between 50 and 51 corresponds in the example shown to the sending of a signal changed 45° positively from the last transmitted signal. Between line 51 and 52 the horizontal line corresponds to the interval after the transmitted wave was shifted 45° negatively from the assumed zero. The horizontal line between 52 and 53 corresponds to the interval following the shifting of the phase 135° positively. Similarly the horizontal line to the right of 53 corresponds to the interval after the transmission of a 135° negative shift of phase. It will be especially noted that the horizontal line between 57 and 58 corresponds to an interval after the shift of phase of 45° positively which follows a positive shift of 135° without an intervening negative shift, the indicated level being still above an assumed zero change of phase. Since each portion of any horizontal line actually indicates a held transmitter phase there can be no information transfer without a phase shift and the zero level of information signal is not otherwise shown. Since positive and negative shifts of 180° are in all respects alike the result would be ambiguous, and such a phase shift is not used.

Referring to curve M it will be noted at 50 that a wave assumed to be at some phase such as 0° is advanced by 45°, which phase condition continues to the point 51, at which time a negative 45° shift is imposed to return the signal to its initial phase. A phase shift of +135° at 52 is then illustrated followed by a shift of −135° at 53. Similar shifts at 55, 56, 57, 58 and 59 are shown corresponding to the shifts of curve L. The lightly dotted line is sketched in for reference to indicate the condition of the unshifted wave as generated in the transmitter. However, this phase relation, which might be referred to as the absolute zero of phase shift, is of little consequence in a detection system according to this invention inasmuch as only changes of phase communicate information. It is thus obviously unnecessary to transmit a reference signal, or to otherwise develop at the receiver a signal representing the absolute phase.

Line N of FIG. 2 is similar to line G except that it represents the output of filter F for a four level input signal. Curve N accordingly consists of a series of voltage spikes each of which represents the change in the sum or integral of the voltage represented in the line M of FIG. 2, where each departure in the summed voltage shows a momentary increase or decrease in the averaged voltage curve, where the increase or decrease is proportional to the degree of change in phase occurring in the received wave. In the absence of a shift in frequency accompanying the phase shift, i.e., phase shift only, each such change in the averaged level is of momentary duration determined, according to well known techniques, by the changing of the valve of the resistors 23 or 26 and capacitors 24 or 25 of the filter F. Some further change in the shape of these voltage excursions may also occur in the amplifier G, as will be understood by those skilled in the art, and as may be varied by well known techniques to produce maximum voltage excursions of appropriate duration to produce a signal similar to that represented in curve N.

It may be noted that curve N contains signals of four levels in which the 45° phase shifts are indicated at low level, either positive or negative at 51′, 54′, 55′, 57′, etc. The voltage excursions are shown much larger at 52′, 53′, 56′, etc., to illustrate a larger change of phase. The reason for this will appear more clearly in connection with the description of the summing circuit. One means of accomplishing this definite difference of signal level as an output of the filter F is achieved by the selection of +45°, −45°, +135°, and −135° of phase shift occurring at the transmitter. Such a signal when received and processed as hereinbefore described produces a curve as shown at L in which the positive shifts are of two widely separated levels and the negative shifts are of similarly widely separated levels. In the illustration provided it may be noted that no shifts of plus or minus 90° are illustrated. It will be understood that in other choices of phase shift the receiver would respond as shown in curve N so long as two separable levels of positive and two levels of negative shift were available for detection.

In order to recover the information from multi-level signals impressed upon the carrier there is a way provided for distinguishing both the polarity of the phase change and the magnitude of the phase change, and for representing such input signal levels at the transmitter as corresponding signal levels in the receiver. Curve H was derived from curve G merely by causing one of two flip-flop amplifiers to be turned on in response to a voltage excursion of positive nature in curve G, and to be turned off by a corresponding negative voltage excursion, thereby to produce a square wave output as shown. To convert voltage excursions as shown at N into square wave outputs like those shown in curve L requires additional circuitry which may be connected to the amplifier output indicated at 30 of FIG. 3.

One form of amplitude and polarity distinguishing apparatus is illustrated in FIG. 4 in which four trigger circuits are employed, two to register low value voltage excursions and two to register the large value voltage excursions, one pair for positive and another pair for negative voltages. These four trigger circuits may be of various types but are here illustrated as Schmitt triggers designated W, X, Y and Z, each having an input circuit connected to the line 30 including variable attenuators 64, 65, 66 and 67 and coupling capacitors 68, 69, 70 and 71. It will be understood that the input circuits do not necessarily contain provision for variation of the respective input signal levels as shown, since other means of properly adjusting the relative inputs may be provided, for example, by way of selection of appropriate resistance values each appropriate to a constant response trigger circuit W, X, Y and Z. Solid state triggers are of particular value for this purpose. Each trigger circuit is generally like each other trigger circuit used in the combination, except that it is most efficient to operate the positive signal pair W and X from a positive voltage supply in which the transistors 72 and 73 of W would normally be of the NPN type. Triggers Y and Z would then be energized from a negative source to register negative voltage excursions of the curve N and would accordingly normally be of the PNP type.

Considering somewhat more in detail the construction of the trigger W the input signal is coupled by way of capacitor 68 to the junction of two resistors 74 and 75, which junction is connected to the base terminal of transistor 72, the opposite end of resistor 74 being supplied with a positive source of potential at +V and the opposite end of resistor 75 being connected to ground as by grounded bus 76. The collector of transistor 72 is connected to the positive voltage supply as by a resistor 77 and the emitter is connected to bus 76 as by resistor 78, each resistor being selected in accordance with the characteristics of the transistor and the signal level which is desired to process and register, according to well known transistor circuit design. Transistor 73 has its base also connected to the ground bus 76 by a resistor 79 and has its emitter connected to the emitter of transistor 72 and thence to ground by way of the common resistor 78. The collector of transistor 73 is supplied by way of resistor

80 from the positive voltage supply. Cross-coupling is provided in part by the common resistor 78 and in part by a connection from the collector of transistor 72 to the base of transistor 73 by way of a resistor 81 and parallel-connected capacitor 82, such that resistors 77, 81 and 79 form a bias circuit for the transistor 73. Output from trigger W is taken at two points, the primary output being taken as trigger output #1 from the collector of transistor 73 as indicated. A second output is taken from the collector of transistor 72 and combined with the output of trigger X as will hereafter be seen. Trigger X has two transistors 83 and 84 like transistors 72 and 73, each supplied with voltage from the same source and each biased in a manner similar to trigger W. Output from trigger X is taken at the collector of the second transistor 84 of the pair similar to output #1 from trigger W.

To form output #2 the output from trigger X is combined with the second output from the trigger W via a coincidence gating circuit in which connection is made to the positive voltage source by means of resistor 85, which is also connected at the opposite end thereof to the triggers W and X, respectively, by a pair of diodes 86 and 87, the first diode being connected to the collector of transistor 72 and the second diode being connected to the collector of transistor 84, each being poled to pass a positive signal to its junction with resistor 85, which then forms the point of connection for output #2. It will be noted that the impedances between +V and the collectors of transistors 72 and 84 will have voltage thereacross when conducting and that simultaneous cutoff will occur when positive signals from the first transistor 72 of trigger W and from the second transistor of trigger X combine at output #2.

Negative triggers Y and Z are each connected to a negative voltage supply −V for the passing of negative signals to outputs #3 and #4 in a manner similar to the connection for triggers W and X. Trigger Y consists of a pair of transistors 88 and 89 each of the PNP type, biased and cross-coupled as in the case of trigger W. Trigger Z has a pair of PNP transistors 90 and 91, also biased as in the case of trigger W. Triggers Y and Z have a voltage supply selected to be like the voltage on triggers W and X except for opposite polarity. Each collector element is connected to this voltage supply in the same manner as for trigger W and the emitters are similarly connected to grounded line 76 via a resistor generally like 78. Each base is also connected to the ground line by resistors similar to 75 and 79. Output from trigger Z is taken from transistor 91 at terminal #4 and the output from trigger Y is taken from transistor 89 as in the case of trigger X, this output being combined with the second output of trigger Z by passing, respectively, through two diodes 92 and 93 to a common junction at which is connected ouput #3, and a resistor 94 connected at its opposite end to the negative voltage supply. A positive voltage of square wave type is therefore developed at output #1 and a second positive voltage at output #2, while a third output is taken at terminal #3, and a fourth output at terminal #4, each of negative square wave type corresponding to positive square signals occurring at terminals #1 and #2.

In order to reconstruct an output signal from the combined triggers which is similar to the input information signal at the transmitter, as illustrated in curve L, the outputs from terminals 1, 2, 3 and 4 require weighting in a summing and combining amplifier in which outputs 1 and 4 are taken at full value and outputs 2 and 3 are halved in value before summing. The summing amplifier may be of any well known design and could consist merely of a resistive network designed to accomplish the purpose. This output is schematically illustrated in FIG. 4 in which the weighting function is illustrated as accomplished by blocks 95, 96, 97 and 98, each with an output as indicated supplied to a summing amplifier 99, which may be a resistive coupling, with amplification, of any convenient type well known in the art. Output of summing circuit 99 is indicated as similar to the voltage curve at L.

It will be appreciated that other circuitry may be employed for distinguishing the voltage levels derived from the filter F in the case of multi-level signals. Details of another circuit by which such a receiver might be caused to distinguish between degrees of phase shift represented in the input signal to the transmitter employing an unused phase position are illustrated in copending patent application Ser. No. 69,878, filed November 17, 1960, by Cecil A. Crafts. This copending application also illustrates one possible means of constructing a transmitter to produce a signal which may be received by the method of this invention.

Regardless of the transmission method and the receiving apparatus used, recovery of a signal corresponding to that illustrated at curve M by this detection method involves the detection of a phase shift of either positive or negative sign and a second determination of whether this signal is large or small. Inputs for triggers W, X, Y and Z are illustrated as large and small signals of each sign to be handled one by each of the trigger circuits. Trigger W, when triggered by a signal, responds with an output at #1 if the positive signal received by way of line 30 is larger than the positive signal indicated at "on," and will be triggered to flop back to its unactuated position when that signal falls below the level indicated at "off." Similarly, trigger Z has a negative output at #4 when a negative signal received from line 30 exceeds the value indicated at "on" and flops back to the unactuated position when that signal falls below the value indicated at "off." Similarly, triggers X and Y operate with positive or negative signals to turn the trigger "on" at values substantially below the "off" values for triggers W and Z and to revert to the unactuated position at values below the corresponding "on" values for the two trigger circuits.

In order to indicate the Boolean logic equations appropriate to other modes of processing, four symbols corresponding to the output of the four trigger outputs might be represented as: $1=\overline{A}+B$; $2=\overline{A}+B$; $3=C+\overline{D}$; and $4=C+D$. In this representation A, B, C and D would represented the presence of output from triggers W, X, Y and Z, respectively, $\overline{A}$ and $\overline{D}$ would represent the condition of A and D outputs barred by the fact that the signals had fallen below the two "off" positions for the positive and negative large signals. Thus, output symbols 2 and 3 indicate that the positive or negative signal is below that which turns "off" triggers W and Z and above that which turns "on" triggers X and Y.

Output from the summing amplifier may be employed for any suitable purpose such as the operation of a teleprinter or other teletypewriter apparatus, or may be fed directly into a computer, as in the case of direct reception of data transmissions from ships, aircraft or missiles, or from other radio and radar outputs as may be desired.

Figure 6:
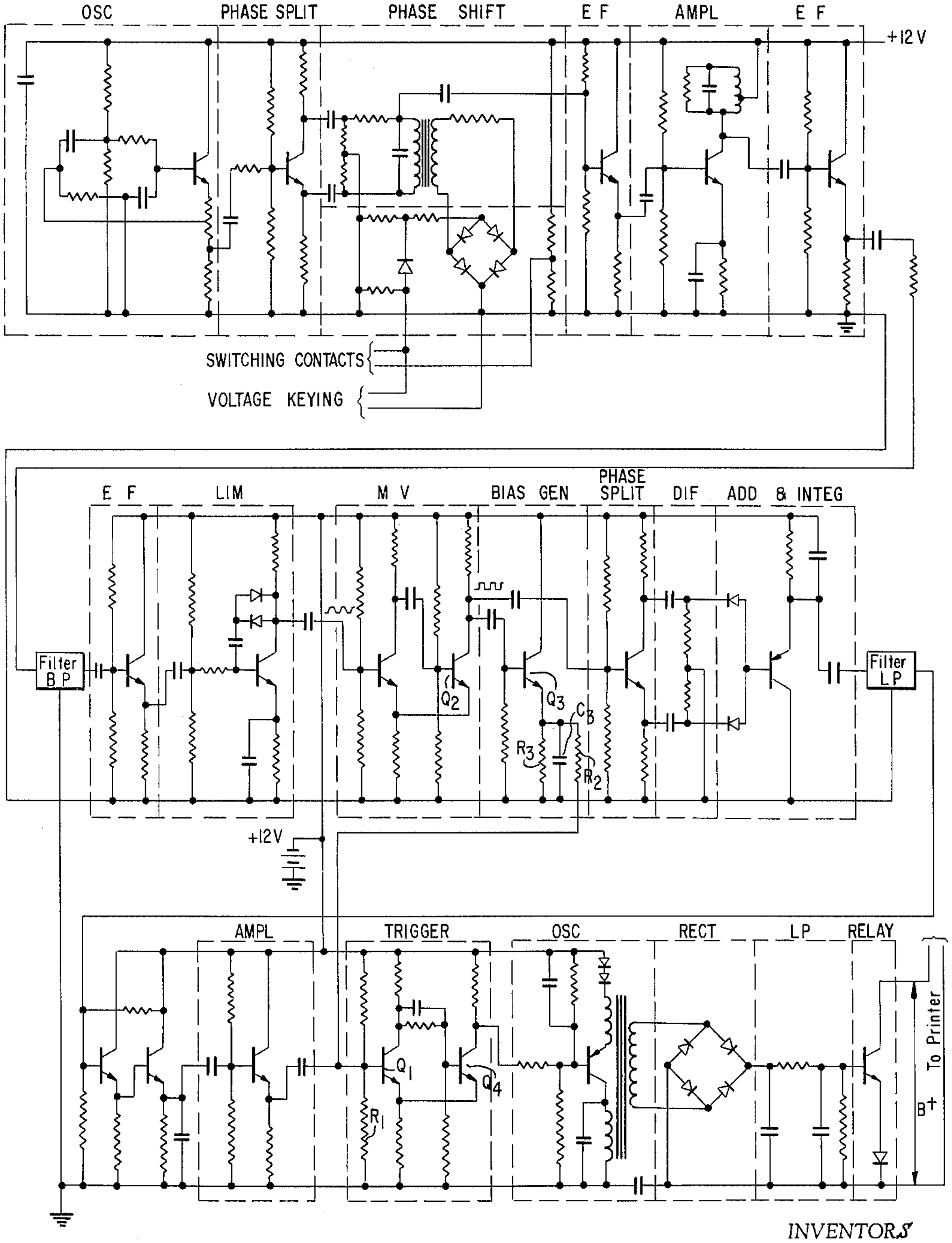
FIG. 6 illustrates receiver apparatus, including a mark-hold feature desirably of simple practical form especially useful in driving teleprinter apparatus, and a transmitter.
Figure 7:
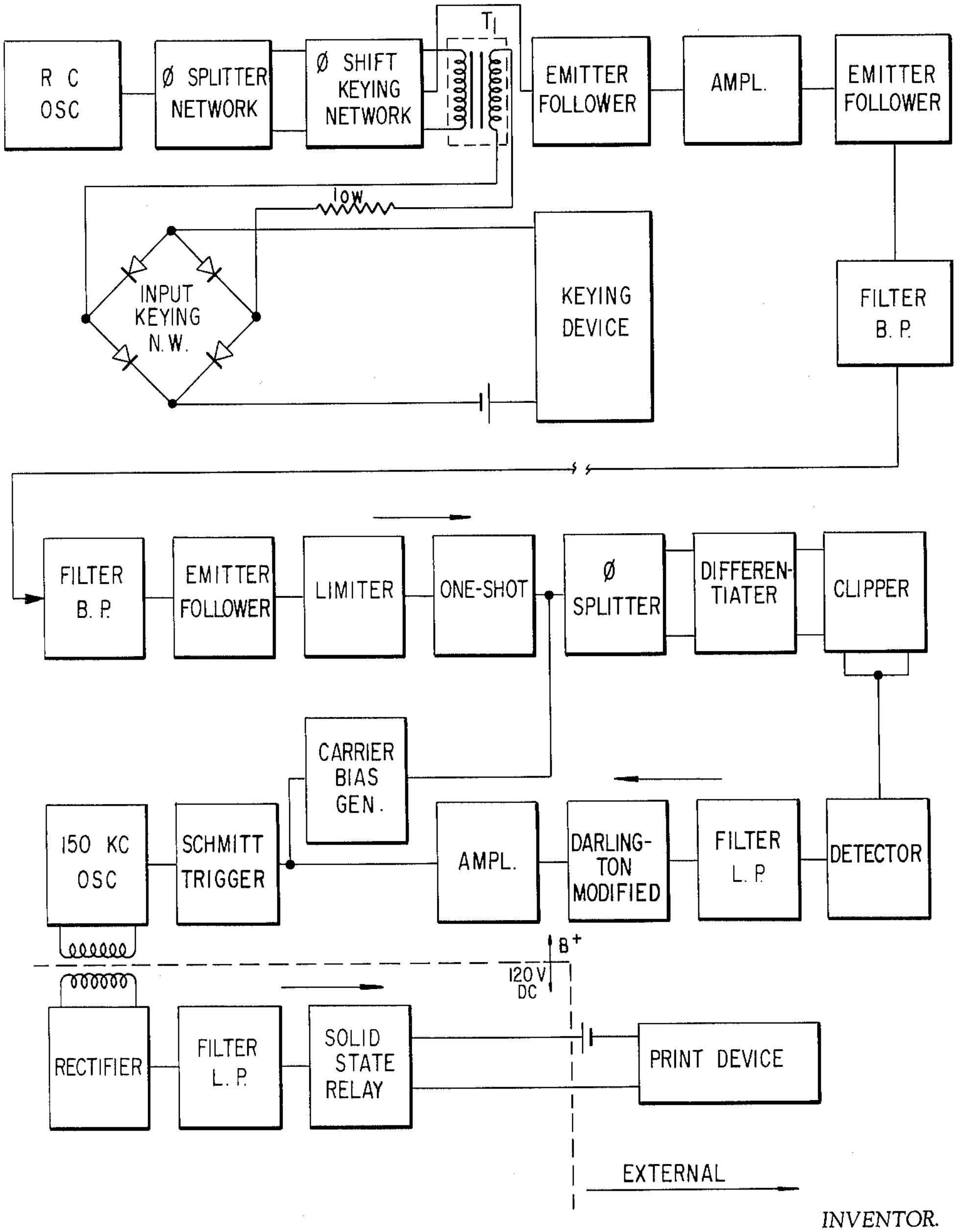
FIG. 7 is a system block diagram of a preferred embodiment particularly suitable for closed circuit service.

An embodiment of a system according to this invention, preferred because of the simplicity for particular uses, is illustrated in the block diagram of FIG. 7 and in the schematic diagram of FIG. 6. The block diagram includes an RC oscillator, preferably followed by a phase splitter network, a phase keying network having an output emitter follower, a stage of amplification, preferably a further emitter follower, and a band pass filter, or the equivalent, feeding to the line or other communication link. Keying is preferably accomplished by means of a keying circuit having an input comprising a binary information signal, the keying device output being fed to a diode bridge constructed according to well known principles to provide a lowered impedance across the bridge when current is caused to flow longitudinally thereof. The keying device thus provides intervals of conduction of the diodes of the bridge to present a low impedance at transformer $T_1$ which has a primary connected across the diode bridge and a secondary connected into the phase shift network to provide a predetermined shift of phase whenever the bridge is conducting, and an unshifted phase corresponding to the RC oscillator normal output when the bridge is not conducting.

The receiving portion in the block diagram comprises preferably a band pass filter connected to the line, followed by an emitter follower, a limiter, a one-shot multivibrator, a phase splitter, a differentiator stage, a clipper stage, and detector apparatus generally as hereinbefore described. An added feature is provided to increase the information signal in that both the positive and negative differentiation spikes are added together in alternate order each to produce positive spikes, one for each axis crossing of the received wave.

A further feature illustrated in FIGS. 6 and 7 provides a "mark-hold" circuit to retain the receiver portion in the "mark" condition when no signal is being transmitted, as will later be more fully discussed.

According to this embodiment as in FIG. 6, the desired phase shifted carrier tone is selected by an appropriate band-pass filter and coupled, by an emitter follower which matches the filter impedance of the following stage, to a diode limiter-amplifier. The selected phase shifted carrier is first amplified and then limited, approaching a train of square waves. These pulses drive a single-shot multivibrator which produces square pulses exhibiting very rapid rise and decay times. The pulses are applied to a phase splitter which produces two trains of square pulses, in all respects equal but opposite in phase. These signals are differentiated into a series of successive positive and negative narrow pulses. These signals then may have either the positive or negative pulses removed by a diode clipper action, or the negative pulses may be inverted to provide two sets of narrow pulses interlaced in time. A series of positive (or negative) narrow pulses is obtained which is twice the original carrier pulse repetition rate.

It may be observed that the time separation between successive pulses increases with a corresponding carrier phase shift constituting a phase retardation, and decreases with a corresponding carrier phase shift which is a phase advancement. Integration of these narrow pulses produces a series of D.C. pulses each of which has duration equal to one-half of the reciprocal of the received carrier frequency, except during the time of phase transients where the pulse width varies in accordance with the direction of the carrier phase shift. These integrated pulses are applied to a low pass filter to remove the carrier frequency component (or this frequency doubled) to produce an average D.C. signal showing an increase or a decrease in proportion to the change in energy per pulse of wave thus developed in coincidence with the phase shift transients. These D.C. signals correspond to beginning and termination, respectively, of each altered phase condition transmitted. The D.C. signals so produced may be amplified and processed by a Schmitt trigger circuit to produce the desired rectangular wave form output conforming to the information signal fed to the keying device.

The embodiment here discussed may be adapted to the operation of conventional printing devices operating at power line voltage by feeding the Schmitt trigger output into the controls for a conventional oscillator operating at some frequency such as 150 kilocycles, which may then be transformer-coupled to a rectifier, the output of which is filtered and fed to a solid state relay to key the power operated printing device. By this simple means the low voltage circuitry of the modulator and detector portions of the system may be isolated from the higher voltage signals normally used in operating printing devices.

It is generally desirable to maintain D.C. printing devices in a "mark" condition when not transmitting intelligence. For this reason a "mark-hold" feature is included as shown in FIGS. 6 and 7 wherein in the transistor Q1 is connected as the input of the Schmitt trigger and is shown biased by a pair of resistors between the transistor voltage supply and ground, the bias level being chosen for normal operation such that Q1 may be switched by a D.C. signal received from the low pass filter. The bias on Q1 is further maintained in the ready or operable position by a D.C. output voltage derived from a carrier bias generator whenever there is present in the demodulator a carrier signal.

During the transmission and receipt of a signal by the demodulator portion of the apparatus there will be carrier pulses at the collector of transistor Q2, which is the output transistor of the single shot multivibrator. Upon differentiation these pulses are applied to the base of transistor Q3 which serves principally as the bias generator. As Q3 is forced into conduction, a charge is applied to capacitor C3 and the resulting voltage is applied across resistor R3. During intervals when Q3 is not conducting and is in the off position, capacitor C3 discharges through resistor R3, thereby sustaining nearly the same voltage over the succeeding interval of time until Q3 again conducts. When no carrier is being received and pulses are not available within the demodulator, no pulses reach the collector of Q2 with the result that Q3 cannot be turned on. Thus, during a period of no received pulses, the base bias voltage of Q1 is reduced approximately 75%. Discharge of C3 through resistors R2, R3 and R1 in parallel cuts off Q1 and forces the second stage of the Schmitt trigger Q4 to remain on. This is the condition for the output of a steady "mark" signal in the output loop.

The "mark-hold" feature just described is particularly suitable for use in local circuits, or otherwise under conditions such that no interruption of circuitry occurs and no spurious "space" signals pass the input band pass filter. When employed in this way the circuit provides a simple and convenient means by which signals received from any source, whether computer, telemetry, telegraphy, or radio, may be transformed simply into a form suitable for transfer about a local installation without the requirement of coaxial lines otherwise found necessary for transferring signals of high transient content, as would be usual in D.C. binary outputs in high speed communication. Such a local circuit may be employed with any type of receiver producing a D.C. binary output signal corresponding to an information signal transmitted from a distant point. The line coupling the modulator and demodulator portions as in FIG. 7 may be broken or interconnected with additional demodulator circuits, or otherwise patched as necessary without impedance matching difficulties normally encountered in the transfer of D.C. signals having steep wave transient characteristics.

While the invention has been described with respect to particular apparatus which illustrates preferred modes of operation according to this invention, it will be appreciated that other apparatus may be employed for the same purposes without departing from the spirit of the invention as herein disclosed and that various modifications are intended accordingly, to be included within the scope of the appended claims.

What is claimed is:

1. A communication system comprising (a) a source of fixed frequency oscillations, (b) at least one phase-shift means adapted to shift the phase of said oscillations in paired shifts of greater than 120° and less than 180°, being of like amount in opposite directions, (c) an output circuit connected for transmission of output from said phase shift means, (d) phase keying means for shifting the phase in said output circuit in accordance with a binary signal thereto, (e) means in said output circuit for converting said phase shifts to frequency transients occurring after said keying and extending over plural cycles of said frequency of oscillation, (f) signal transferring means for said frequency, (g) receiver means including band pass filtering means further confining the received signal and transients thereon to desired limits, (h) amplifying and amplitude-limiting means enhancing axis crossing occurrences of said received wave, (i) fixed duration square wave generating means responsive to said axis crossings for generating a signal whose average value is proportional to the received transient departures from said frequency, (j) second square wave generating means responsive to said average signal producing an output responsive to the transient shift occurring during the transition from one phase of transmission to another, and (k) means indicating the output of last said square wave generating means corresponding to said phase shift keying binary signal.

2. The method of transmitting binary information as discrete phase shifts in a transmitted wave supplied at fixed frequency comprising (a) shifting the phase of the wave in paired equal and opposite increments according to a binary information signal, (b) limiting the output frequency of transmitted wave to pass deviations from said frequency due to said phase shift as transients of frequency less than a predetermined amount and extending over a plurality of cycles thereof, (c) receiving said transmitted wave with said transient frequency increments, (d) band pass filtering said received wave to further confine received energy to narrow limits of transient frequency at the time of phase shift in said transmitter, and (e) converting said frequency transients to a binary signal corresponding to said paired equal increments of phase shift.

3. The method of transmission of a digital data signal which comprises (a) generating a fixed frequency voltage wave of constant phase with respect to an arbitrary time standard, (b) phase shifting portions of said wave each in proportion to a digital value in said data signal, (c) passing said phase shifted portions of wave in succession to a common transmission channel, and (d) frequency limiting the transient portions of said fixed frequency following said changes of phase, thereby to transmit a wave which varies transiently in axis-crossing frequency, limited to a predetermined maximum shift of axis-crossing frequency within transient intervals only, said transmitted wave thereby conveying information in the form of transients during controlled intervals following each phase shift.

4. The method of transmitting information contained in a binary data signal comprising (a) generating a signal of controlled single frequency and constant phase, (b) phase shifting said signal by equal and opposite changes of phase in response to successive bits of said binary signal, said changes exceeding 145°, (c) applying said phase shifted signal to a transmission output circuit, (d) reactively limiting the transient frequencies in said output circuit consequent upon the said shifts of phase, and (e) transmitting the resulting signal at a single frequency interspersed at bit intervals with transients of effectively increased axis-crossing frequency resulting from changes of phase in one sense and of effectively decreased axis-crossing frequency resulting from changes of phase in the opposite sense according to said information signal.

5. The method of modulating a wave for transmission of binary data which comprises (a) generating a single stabilized frequency transmission wave,
(b) phase shifting said wave at intervals in equal increments of phase greater than 120° and less than 180°,
(c) selecting for successive transmission oppositely shifted phase portions timed according to said data,
(d) combining said selected portions in a common transmission channel,
(e) reactively extending the transition from one said portion to another sufficiently to eliminate axis-crossing frequency excursions beyond a desired limit, and
(f) transmitting in said channel said stabilized frequency wave including axis-crossing frequency excursions resulting from phase change within said limit.

6. The method of recovery of a phase shift keying signal used in modulating a transmitted wave generated at fixed frequency comprising (a) receiving said wave,
(b) band pass limiting the received wave to accept said frequency with included deviation therefrom constituting only keying transients,
(c) developing from said received wave a signal having an average voltage of constant value for constant frequency and varying values in proportion to transient deviations of frequency and
(d) indicating said developed signal in the form of a second developed signal having voltage values in proportion to said phase shift keying signal.

7. The method of claim 6 further comprising developing from said received wave a reference signal having an altered value in the absence of a received wave and employing said altered value of reference signal to maintain said second developed signal as a selected one of the values of said keying signal.

8. The method of transmitting and receiving digital data in the form of phase shifts of a single frequency which comprises (a) generating a voltage wave of said single frequency,
(b) generating a binary signal representing digital data,
(c) phase shifting said wave in equal increments in response to said signal,
(d) applying said phase shifted signal to a common transmission channel,
(e) frequency limiting said wave in said common channel to confine transmission of transient frequencies within predetermined limits,
(f) and recovering said binary signal by the method of claim 8.

9. The method of transferring digital information bits at high speed by modulated carrier wave which comprises (a) generating a fixed frequency electrical wave,
(b) deriving from said wave two like components differing only as to a phase angle substantially less than 180°,
(c) selecting alternately each of said components for durations respectively corresponding to said bits,
(d) applying said selected wave components to a communication channel possessing controlled impedance at said frequency at a transmission rate to cause the resulting phase shifts in said channel to occupy substantially the full duration of at least some of said bits, and
(e) recovering at a receiver said digital information bits by detecting the change in axis-crossing frequency of the received signal and integrating the detected signal over substantially the period of each bit to provide an output signal differing according to the direction of phase change from one selected phase to another.

10. The method of communicating digital information at high bit rates on a single frequency comprising (a) generating a single frequency carrier wave in a reactive circuit,
(b) producing from said wave a like wave differing therefrom by a fixed phase angle in the range between 120° and 160°,
(c) transmitting both said waves by switching in first said carrier wave and then said like wave at intervals according to said information and at a switching rate sufficiently high that at least some phase shift transients occupy substantially the full interval between said switchings,
(d) receiving said wave, and
(e) detecting the effective successive axis-crossing-time variations and representing said variations in the form of a D.C. signal inversely proportional to the separation of said axis crossings in said received wave during each phase-shift interval.

11. A keyed digital information communication system including a transmitter and receiver coupled in narrow frequency band channels comprising (a) means generating a fixed frequency wave for each said channel,
(b) means selecting a pair of components of said wave differing from each other in phase by more than one-third cycle and substantially less than one-half cycle, said means being controlled according to said digital information,
(c) circuit means applying said selected phase components in succession as an output signal for said transmitter, and
(d) impedance means in said circuit means transforming changes of phase of said signal into a frequency transient selected to cause shifts from one to the other said phase to be completed in an interval substantially equal to the keying interval at a preselected rate of keying.

12. The system of claim 11 including frequency discriminator means operative to detect each said transmitted frequency transient as a direct current pulse of opposite polarity for opposite shifts from one said phase component to the other.

13. A non-synchronous receiver for a fixed frequency wave modulated in digital bits by equal and opposite phase shifts less than 180° and greater than 120°, the directions of said phase shifts constituting marks and spaces, respectively, of an information signal, comprising (a) means receiving a frequency-limited bandwidth of signal substantially centered at the frequency of said wave,
(b) means responsive to the precise times of axis-crossing of the cycles of received wave for generating thereat a unidirectional pulse of predetermined energy for each axis crossing in a selected direction not coincident with a prior said pulse,
(c) means integrating said pulses over a period including substantially one of said digital bits, and
(d) digital means indicating separately deviations of said average above and below the steady average obtained at equal interval axis crossings.

14. A receiver according to claim 13, said indicating means including a bistable wave generator triggered to opposite conductive states for said deviations above and below said steady average.

15. A receiver according to claim 13 further comprising means developing a bias condition during the receipt of said fixed frequency wave for enabling said indicating means and a bias condition for preventing operation of said indicating means when said wave is not being received.

16. A detector for recovering from a received carrier wave information signals impressed thereupon by keyed shifts in phase of a transmitted wave comprising, filtering means for the received wave, amplifying and clipping means effective to represent said received wave in squared form, trigger signal producing means operative for each zero crossing of said squared wave of a selected polarity, means producing a signal of constant time and amplitude product for each said trigger signal, means averaging successive said constant signals over a plurality of cycles of received wave to provide response to variations due to said keyed shifts in the transmitted wave, means distinguishing differing degrees of said response, and means representing said degrees of response as information signals of different level.

17. A detector according to claim 16, said distinguishing means comprising separate trigger means responsive to each said degree of shift.

18. A detector according to claim 16 wherein said degrees of shift are represented as a square wave output signal.

19. A communication receiver for digital signals phase-shift modulated upon a carrier frequency comprising, filtered receiver means responsive to less than half of an octave of receivable frequencies, limiting means representing received regular cycles of said carrier as symmetrical square waves, trigger means producing one trigger voltage for each said regular cycle, means varying the time of recurrence of said trigger voltages in accordance with said phase-shift modulations on the received carrier, constant signal producing means operated by each said trigger voltage, low pass signal limiting means responsive to variations in the time mean of said constant signals to indicate said modulations, discriminating means differently indicating the degrees of said variations of said time mean, and summing means responsive to the discriminating means output for combining said digital signals as a single output signal.

20. A receiver according to claim 19 wherein said discriminating means includes a plurality of Schmitt trigger circuits energized to produce an output for each said degree of variation of trigger recurrence.

21. A communication receiver for a plurality of modulation signals each superimposed on a carrier frequency as keyed degrees of phase modulation of said frequency including, limiting means converting received cycles of said modulated frequency to square wave form, differentiating and clipping means producing unidirectional voltage trigger signals at said modulated frequency, means producing constant value signals, one for each said trigger signal, means deriving a mean of said constant value signals including means responsive to variation in recurrence time of said trigger signals for varying the mean of said constant value signals according to said modulation signals, means responsive to the variation of the mean signal effective to separate said plurality of modulation signals, and means representing said separated signals as a signal output.

22. A receiver according to claim 21 in which said signal separating means responds to degrees of variation of said mean signal to produce a different value of output voltage for each said variation of mean signal.

23. A receiver according to claim 21 in which said signal separating means comprises a plurality of trigger circuits energized to respond to differences of amount and polarity of changes in said signal mean.

24. A receiver for a key modulated transmitted frequency including a pair of information input signals each representing a specific degree of phase shift including, means effective to represent a received phase-modulated signal as regular square waves of variable recurrence time, means producing a trigger voltage for each cycle of said square wave, means actuated by said trigger voltages to produce a constant width pulse for each triggering, means summing said pulses to produce an average signal varying as the frequency of the received wave, means triggered by said average signal to produce a square wave output signal of magnitude proportional to changes in said average signal, and means coupling said output signal to a utilization circuit.

25. A receiver according to claim 24 having a plurality of trigger circuits, one for each keyed modulation of the transmitted frequency, parallel connected for response to said average signal and each triggerable by a different value of said average signal.

26. A receiver for keyed phase modulations of a fixed frequency carrier wave in accordance with a plurality of information signals each differingly modulating said wave to produce corresponding pairs of phase positions of said carrier wave, means generating a series of trigger voltages regularly recurring in the absence of modulation and varying in recurrence time proportionally to phase modulations, means generating a series of fixed period voltage signals each of constant magnitude, one for each said trigger voltage occurring after termination of the last generated fixed period signal, means summing said series of signals to produce a mean subject to variations proportional to said variations in recurrence time, and trigger means responsive to last said variations effective to generate a multi-level output signal corresponding to said keyed modulations.

27. A receiver according to claim 26 including in said trigger means a plurality of Schmitt trigger circuits energized to produce different levels of output voltage for different phase modulations.

References Cited by the Examiner

UNITED STATES PATENTS

| | | | |
|---|---|---|---|
| 3,112,448 | 11/1963 | McFarlane et al. | 178—66 X |
| 3,121,197 | 2/1964 | Irland | 325—30 |
| 3,123,670 | 3/1964 | Kaenel | 178—66 |

DAVID G. REDINBAUGH, *Primary Examiner.*

J. P. MOHN, S. J. GLASSMAN, *Assistant Examiner.*